(12) United States Patent
Liu

(10) Patent No.: US 7,806,536 B1
(45) Date of Patent: Oct. 5, 2010

(54) CONVEX MIRROR

(76) Inventor: Cheng-Shun Liu, 1F., No. 3, Lane 220, Hsieh Chen Rd., Sanhsia Chen, Taipei Hsien (TW)

( * ) Notice: Subject to any disclaimer, the term of this patent is extended or adjusted under 35 U.S.C. 154(b) by 0 days.

(21) Appl. No.: 12/548,935

(22) Filed: Aug. 27, 2009

(51) Int. Cl.
*G02B 5/10* (2006.01)
*G02B 7/182* (2006.01)

(52) U.S. Cl. ............ 359/868; 359/872; 248/481

(58) Field of Classification Search ........... 359/868, 359/872, 881; 248/480, 481
See application file for complete search history.

(56) References Cited

U.S. PATENT DOCUMENTS

| | | | | |
|---|---|---|---|---|
| 1,386,959 A | * | 8/1921 | Severance et al. | 248/481 |
| 2,613,575 A | * | 10/1952 | Falge | 248/481 |
| 2,615,368 A | * | 10/1952 | McK Bindley | 248/481 |
| 2,969,714 A | * | 1/1961 | Cousino | 248/481 |
| 3,096,061 A | * | 7/1963 | Bertell | 248/481 |
| 3,205,777 A | * | 9/1965 | Brenner | 248/480 |
| 3,316,052 A | * | 4/1967 | Ross | 359/872 |
| 3,338,545 A | * | 8/1967 | Magi | 248/481 |
| 3,391,895 A | * | 7/1968 | Bausch et al. | 248/467 |
| 3,392,950 A | * | 7/1968 | Pierce | 248/279.1 |
| 3,698,798 A | * | 10/1972 | Bolton | 359/881 |
| 5,909,327 A | * | 6/1999 | Liu | 359/872 |

* cited by examiner

*Primary Examiner*—Ricky D Shafer
(74) *Attorney, Agent, or Firm*—Muncy, Geissler, Olds & Lowe, PLLC

(57) ABSTRACT

A convex mirror formed of a back board, a mirror, a ball head connecting rod, a ball socket, a socket cover and a mounting frame is disclosed. The back board has stub rods and retaining holes for receiving respective locating holes and hollow cylindrical posts of the ball socket to facilitate installation of rivets in affixing the ball socket and the back board together. The mirror has a rim inserted in between a rim and equiangularly spaced locating blocks of the back board to facilitate installation of self-tapping screws in affixing the rim of the back board and the rim of the mirror together.

5 Claims, 11 Drawing Sheets

CONVEX MIRROR

BACKGROUND OF THE INVENTION

1. Field of the Invention

The present invention relates to a convex mirror designed for use in a supermarket, shop, etc., and more particularly to such a convex mirror which facilitates installation to save much installation labor and time and, which assures installation stability and avoids deformation of the component parts after installation.

2. Description of the Related Art

U.S. Pat. No. 5,909,327 discloses a convex mirror entitled "convex lens assembly", which issued to the present invention. This design of convex lens assembly, as shown in FIGS. 1-3, is generally comprised of a back board 71, an acrylic convex lens 72, a ball head connecting rod 73, a ball socket 74, a ball socket cover 75, and a nut 76. During installation, the ball head of the front end 731 of the ball head connecting rod 73 is set in the rounded recess 741 of the ball socket 74, and then the circular base 751 of the socket cover 75 is fixedly fastened to the screw holes 742 of the ball socket 74 by screws 743. After the ball head connecting rod 73, the ball socket 74 and the ball socket cover 75 are fastened together, the locating strips 752 of the socket cover 75 are respectively inserted through the locating notches 711; 712; 713 of the back board 71, and then nuts 76 are threaded onto threads 7521 at an outer side. When the locating strips 752 of the socket cover 75 are inserted through the locating notches, a nut 76 is threaded onto the threads 7521 of the locating strips 752 to fix the socket cover 75 to the back board 71. Thereafter, the rim 721 of the convex lens 72 is forced into a front mounting groove 714 of the back board 71 and secured in place by a protruding portion 715 of the back board 71 (see FIG. 3), and then the screw rod 732 at the other end of the ball head connecting rod 73 is fastened to a bracket 8. This design of convex mirror still has room for improvement as follows:

1. When attaching the circular base 751 of the socket cover 75 to the ball socket 74 after insertion of the ball head of the front end 731 of the ball head connecting rod 73 into the rounded recess 741 of the ball socket 74, the ball head connecting rod 73 tends to move, and it will be difficult to insert the screws 743 through the circular base 751 of the socket cover 75 into the screw holes 742 of the ball socket 74, wasting much installation labor and time.

2. After ball head connecting rod 73, the ball socket 74 and the ball socket cover 75 have been fastened together, the locating strips 752 of the socket cover 75 must be respectively inserted through the locating notches 711; 712; 713 of the back board 71, and a nut 76 must be used and threaded onto the threads 7521 of the locating strips 752 to fix the socket cover 75 to the back board 71. When threading the nut 76 onto the threads 7521 of the locating strips 752, the locating strips 752 may displace, and therefore a special tool must be used to hold the locating strips 752 in place for allowing the nut 76 to be threaded onto the threads 7521 of the locating strips 752 positively.

3. The convex lens 72 is fastened to the back board 71 by means of forcing the rim 721 of the convex lens 72 into a front mounting groove 714 of the back board 71 without the use of any screws. However, because the convex lens 72 has a certain dimension, it is difficult to force the whole rim 721 of the convex lens 72 into a front mounting groove 714 of the back board 71. After installation, the convex lens 72 may be forced away from the back board 71 accidentally by an impact.

SUMMARY OF THE INVENTION

The present invention has been accomplished to provide a convex mirror which eliminates the aforesaid drawbacks. It is therefore the main object of the present invention to provide a convex mirror, which assures installation stability and avoids deformation of the component parts after installation, maintaining the quality and appearance. It is another object of the present invention to provide a convex mirror, which facilitates installation, saving much installation labor and time.

To achieve these and other objects of the present invention, a convex mirror is comprised of a back board, a mirror, a ball head connecting rod, a ball socket, a ball socket cover and a mounting frame. By means of forcing respective locating holes and hollow cylindrical posts of the ball socket into engagement with respective stub rods and retaining holes of the back board and then fastening respective rivet holes of the ball socket to respective rivet holes of the back board with rivets, the ball socket and the back board are affixed together. Thereafter, the operator can use one single hand to install screws in affixing the socket cover to the ball socket, and then the operator can insert the rim of the mirror in between the rim of the back board and the locating blocks and then install the self-tapping screws to affix thee back board and the mirror together. Thus, the assembly process of the convex mirror is quite simple and easy, saving much labor and time.

Further, the ball head of the ball head connecting rod is held between the ball socket and the socket cover, and then screws are respectively inserted through respective mounting through holes of the ball socket cover and threaded into respective screw holes of the ball socket to affix the socket cover to the ball socket. At this time, the pressure from the screws is distributed through the rim of the ball socket, avoiding deformation of the ball socket and assuring connection reliability of the ball head connecting rod and maintaining product quality.

Further, during the assembly process of the convex mirror, the rim of the mirror is inserted in between the rim of the back board and the locating blocks and then self-tapping screws are driven into the locating blocks to affix the back board and the mirror together. When driving the self-tapping screws through the rim of the back board and the rim of the mirror to affix the back board and the mirror together, the ends of the self-tapping screws are respectively driven through the inner wall and outer wall of each of the locating blocks, enhancing the connection stability and avoiding loosening or deformation of the mirror due to excessive high fastening pressure.

DETAILED DESCRIPTION OF THE INVENTION

Figure 1:
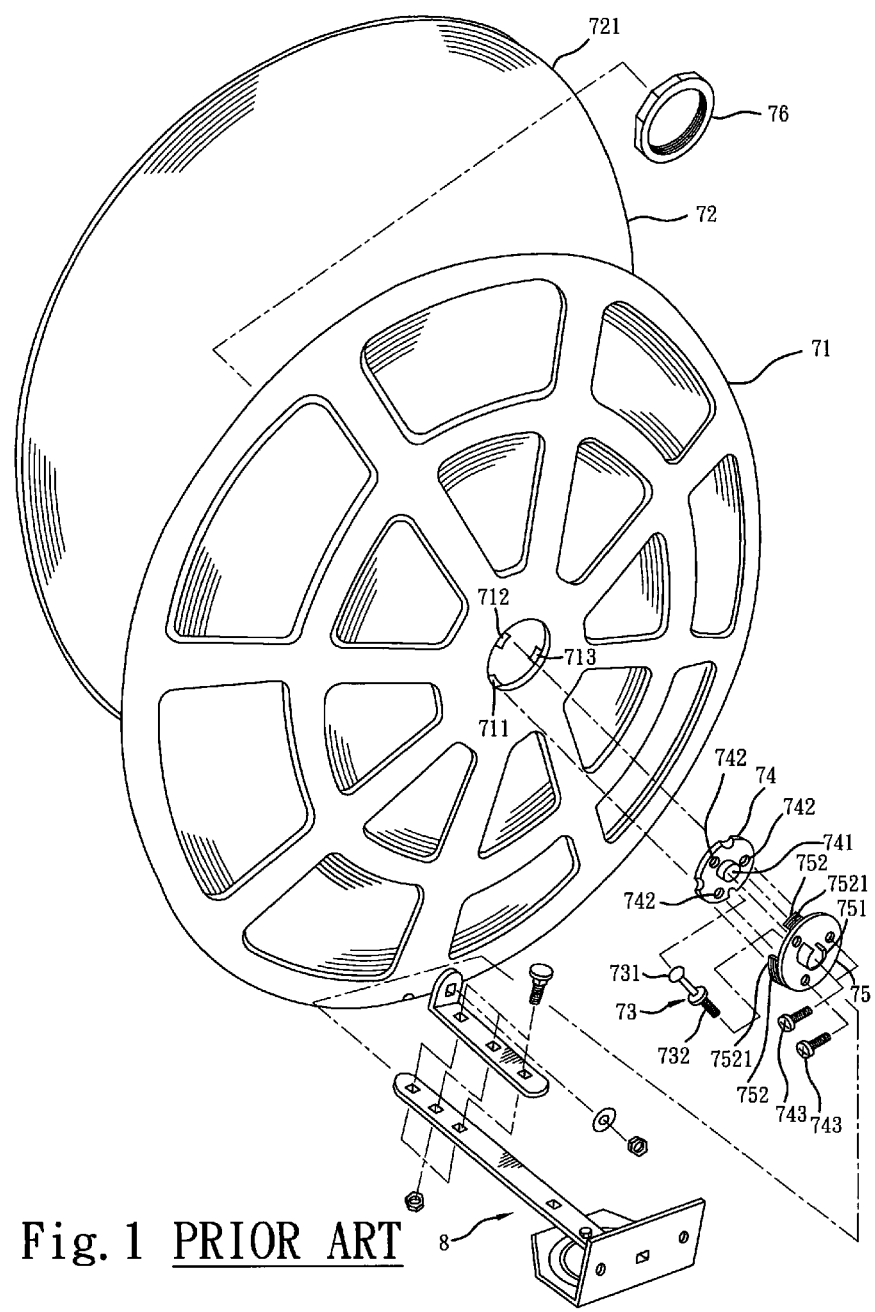
FIG. 1 is an exploded rear view of a convex lens assembly according to the prior art.
Figure 2:
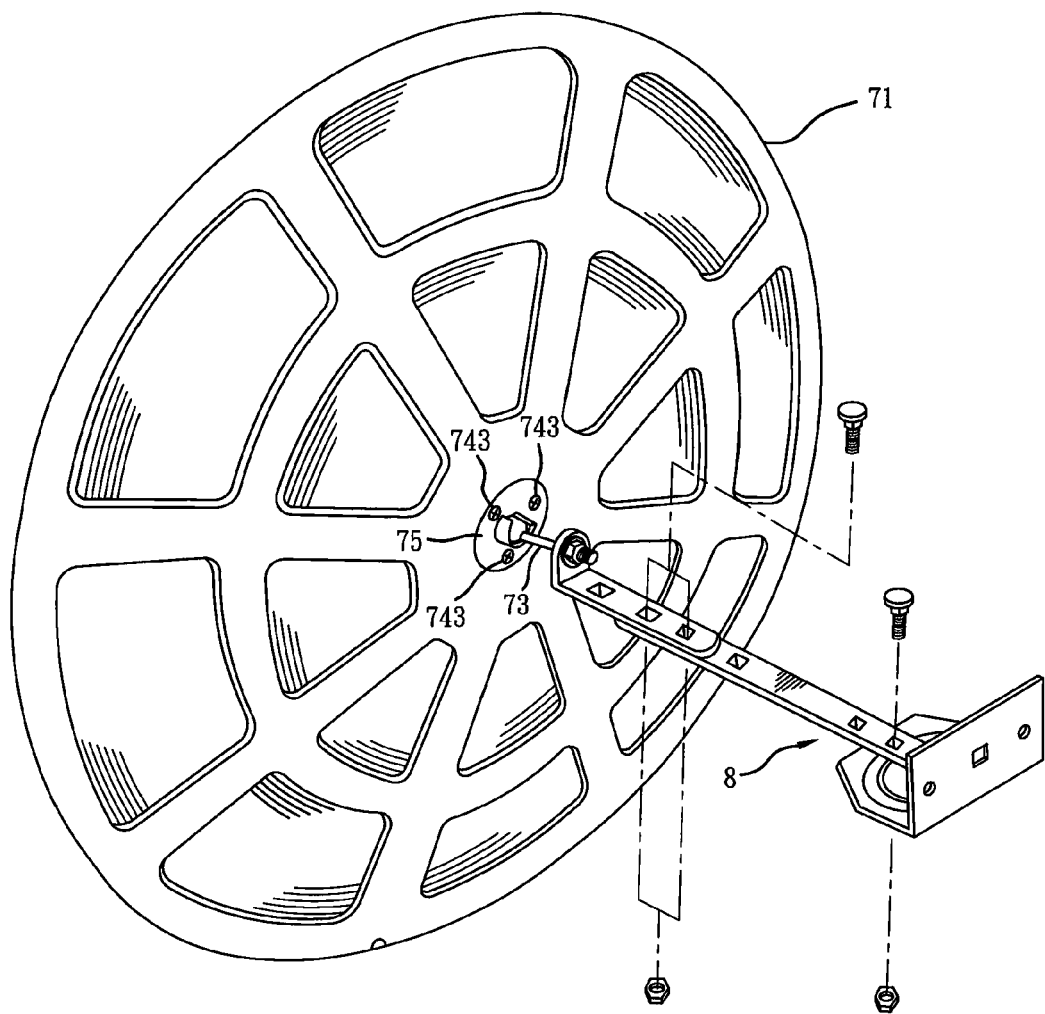
FIG. 2 is a rear assembly view of the convex lens assembly shown in FIG. 1.
Figure 3:
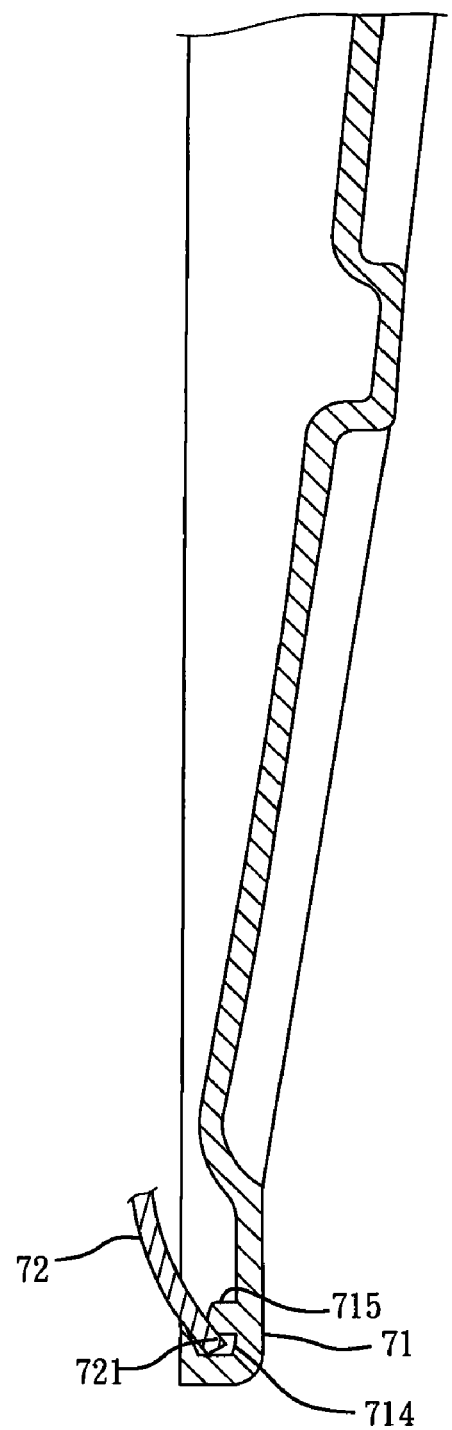
FIG. 3 is a sectional view in an enlarged scale of a part of the convex lens assembly shown in FIG. 1.
Figure 4:
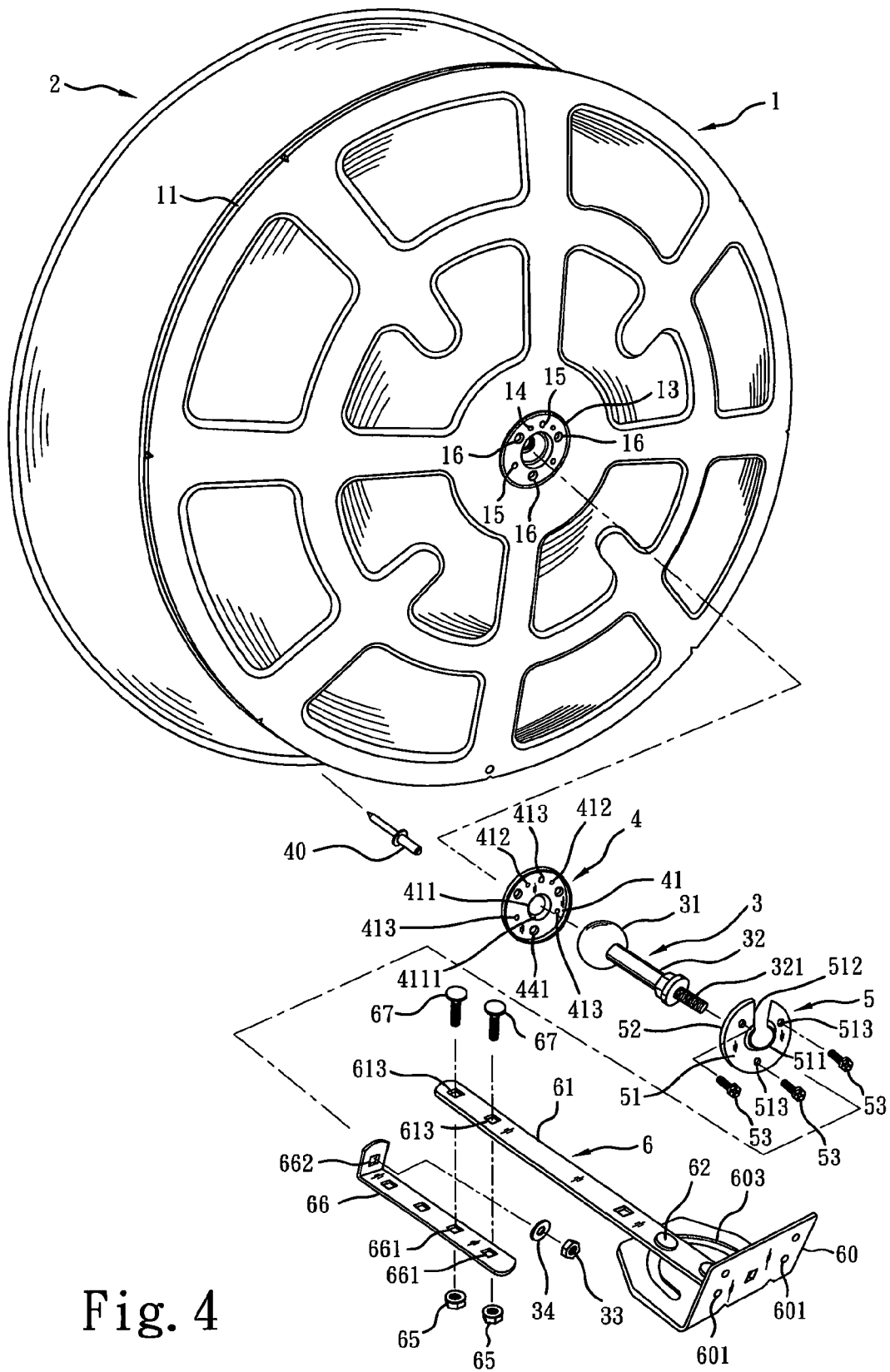
FIG. 4 is a rear exploded view of a convex mirror in accordance with the present invention.

Referring to FIGS. from 4~11, a convex mirror in accordance with the present invention is generally comprised of a back board 1, a mirror 2, a ball head connecting rod 3, a ball socket 4, a ball socket cover 5 and a mounting frame 6.

Figure 6:
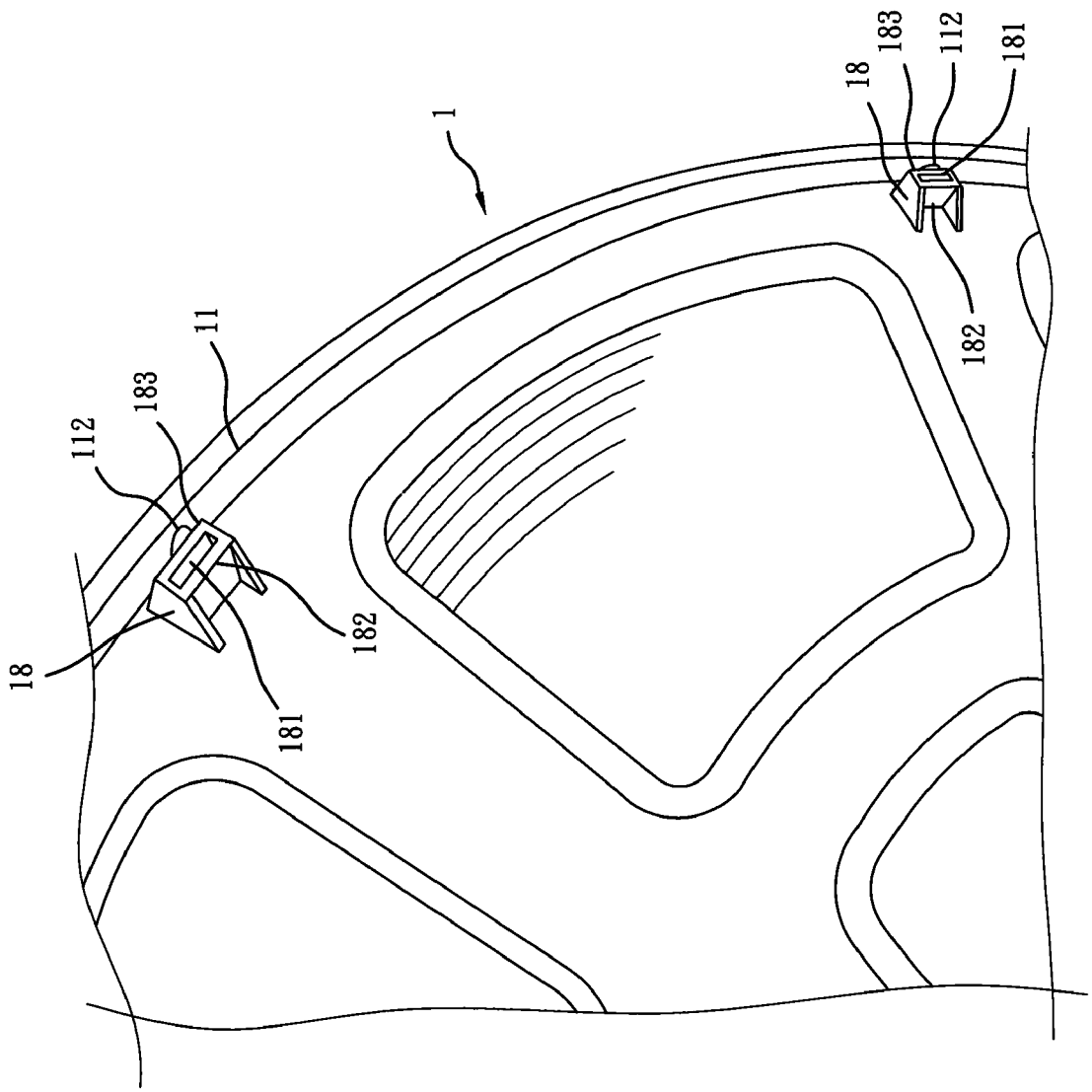
FIG. 6 is an enlarged view of a part of the back board according to the present invention.

The back board 1 is injection-molded from high-impact plastics, having a rim 11 forwardly extended from the front side thereof around the border (see FIG. 6) for holding down the mirror 2 (see FIG. 9), an air vent 12 cut through the front and rear sides thereof near the bottom.

Figure 9:
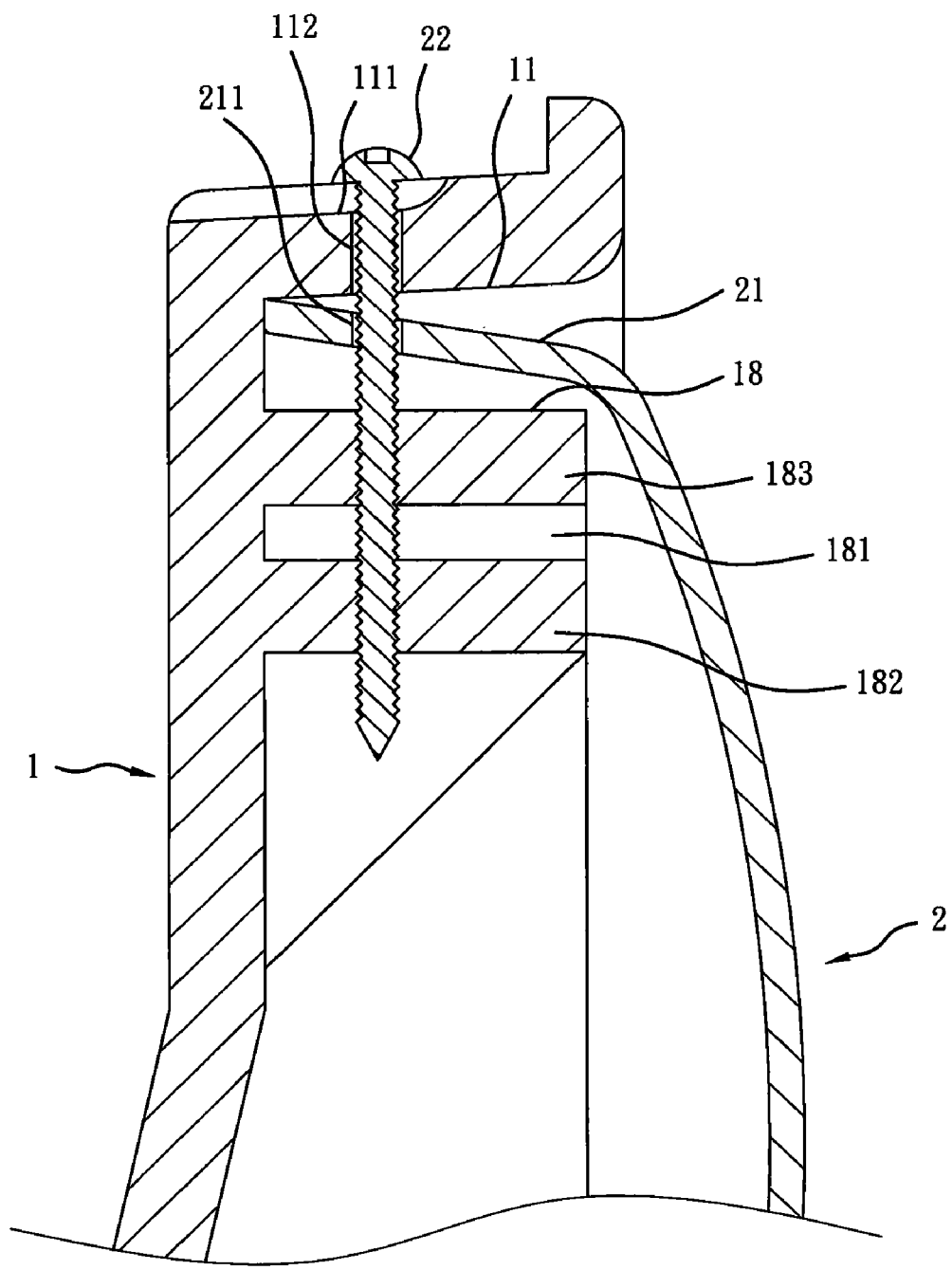
FIG. 9 is a sectional view in an enlarged scale of a part of the present invention, showing the connection arrangement between the back board and the mirror.
Figure 10:
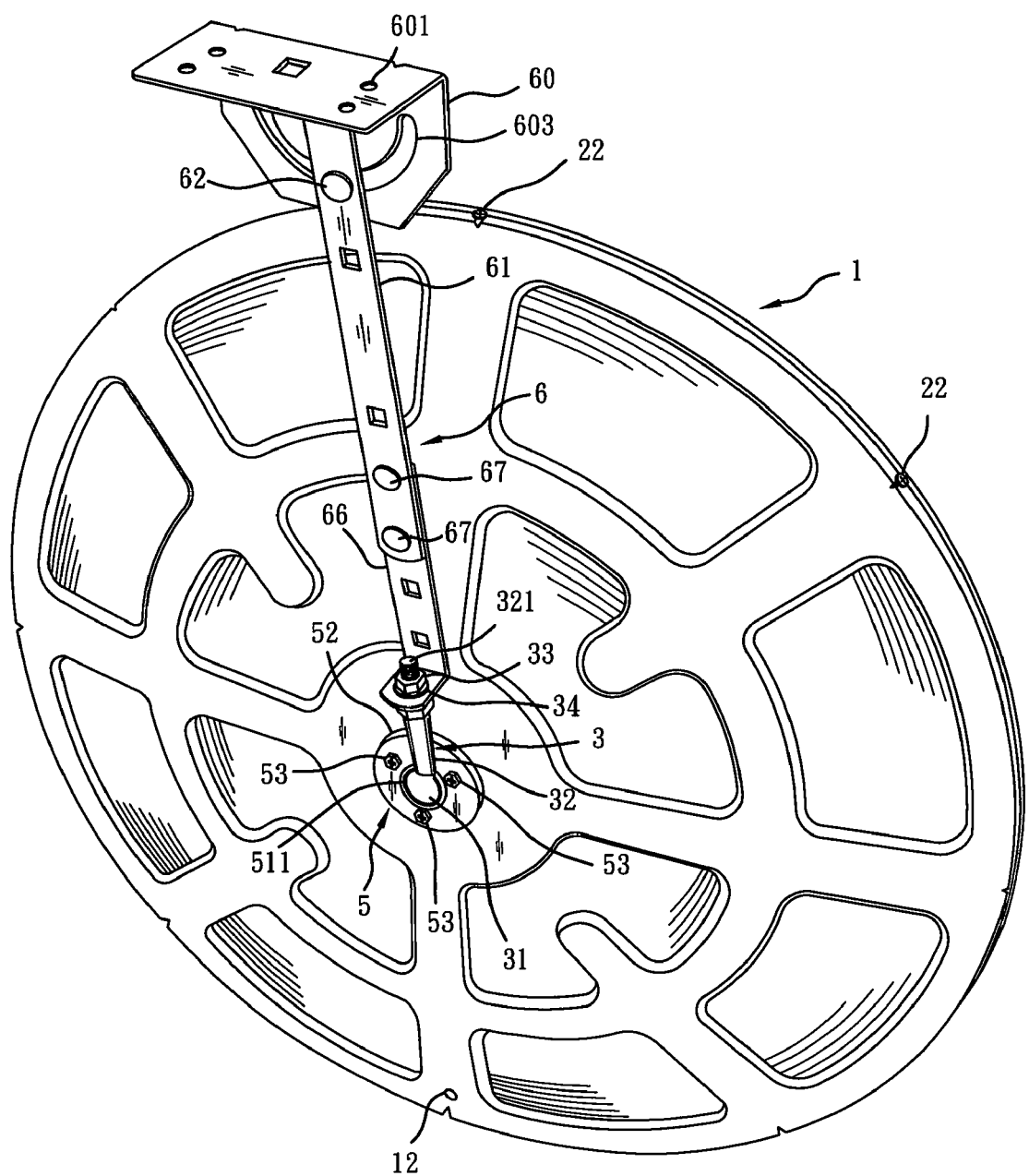
FIG. 10 shows an arrangement of the present invention for installation in a ceiling.
Figure 11:
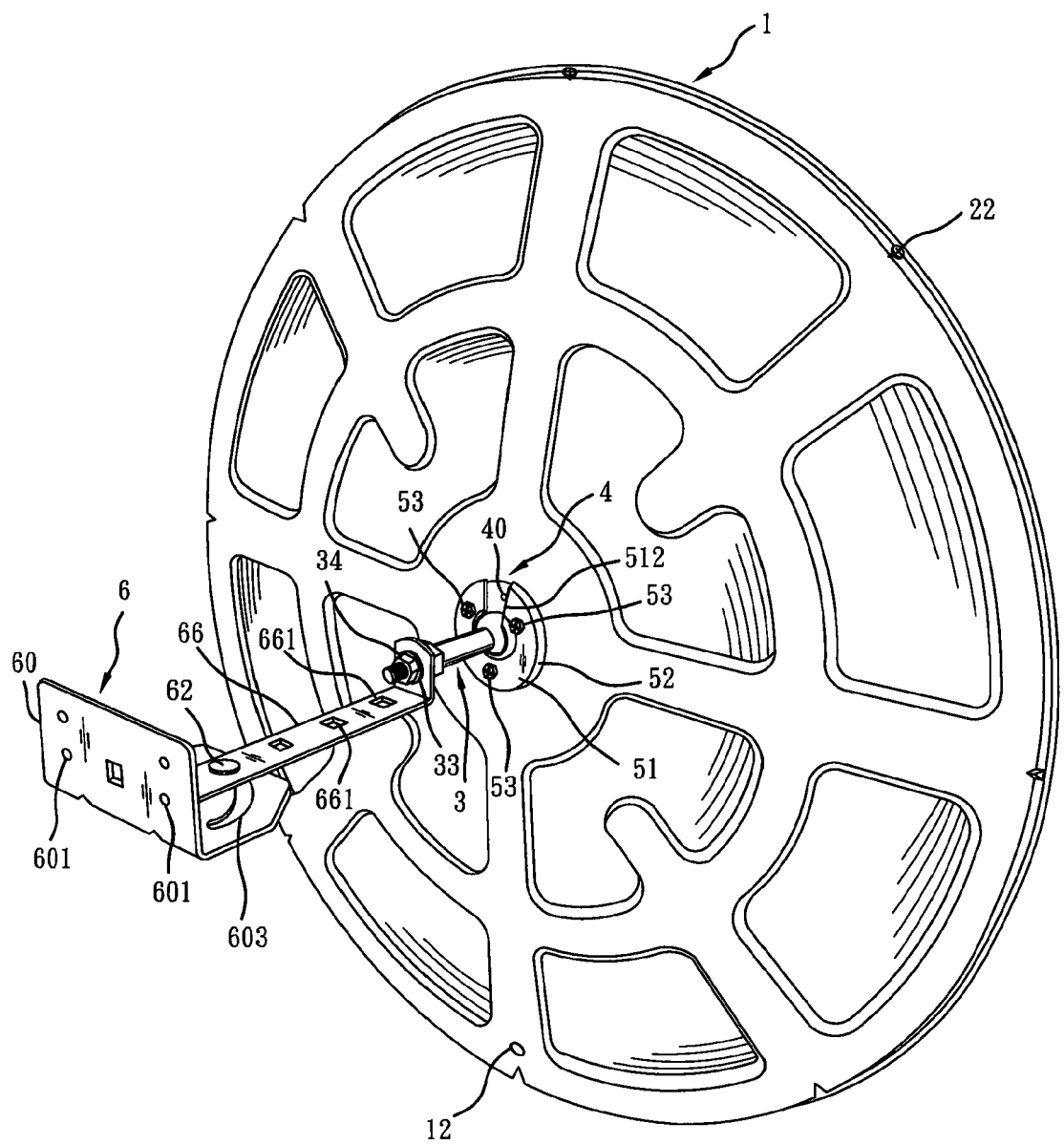
FIG. 11 shows another arrangement of the present invention for installation in a vertical wall.

The mirror 2 is a convex lens molded from polycarbonate, having a rim 21 extending around the border and attached to the inner side of the rim 11 of the back board 1 and affixed thereto with self-tapping screws 22 (see FIG. 9, FIG. 10 and FIG. 11).

The ball head connecting rod 3 has a rod body 32, a ball head 31 at one end of the rod body 32 and a screw rod 321 at the other end of the rod body 32. The screw rod 321 is fastened to a mounting frame 6 with a nut 33 and a washer 34.

Figure 5:
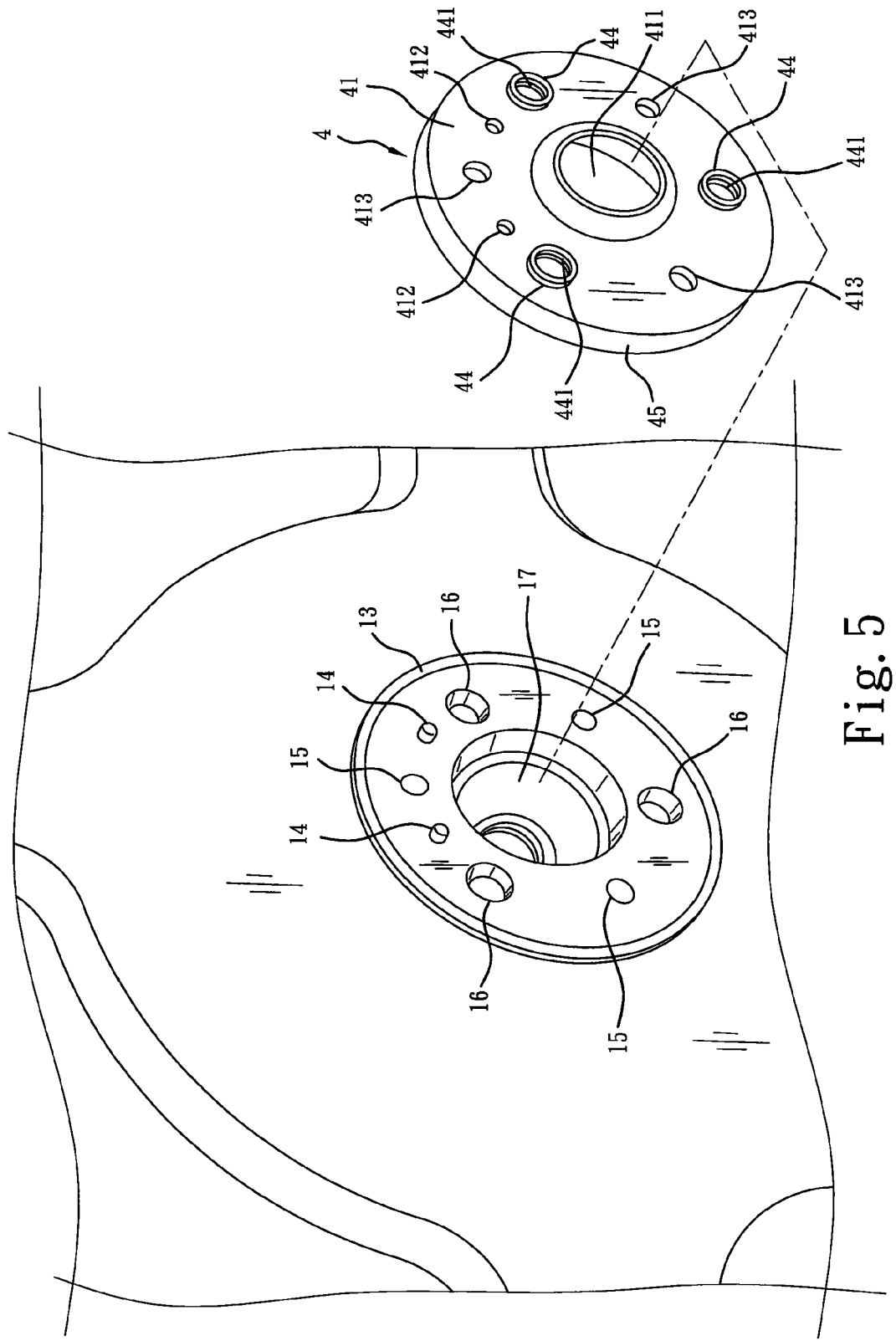
FIG. 5 is an exploded view in an enlarged scale of a part of the present invention, showing the structure of the back board and the ball socket.

The ball socket 4 has a flat circular base 41, a rounded recess 4111 at the center of the flat circular base 41 for receiving the ball head 31 of the ball head connecting rod 3, and a plurality of screw holes 441 equiangularly spaced around the rounded recess 411 (see FIG. 5).

The socket cover 5 is covered on the ball socket 4 to hold the ball head 31 of the ball head connecting rod 3 in the rounded recess 411 of the ball socket 4. The socket cover 5 comprises a circular base 51, a rim 52 perpendicularly expending around the border of the circular base 51, a plurality of mounting through holes 513 respectively fastened to the screw holes 441 of the ball socket 4 by screws 53, a center through hole 511 at the center of the circular base 51 through which the ball head connecting rod 3 passes, and an opening 512 radially extended from the center through hole 511 to the border to provide a space in which the ball head connecting rod 3 is moved to change its angular position relative to the ball socket 4.

Figure 7:
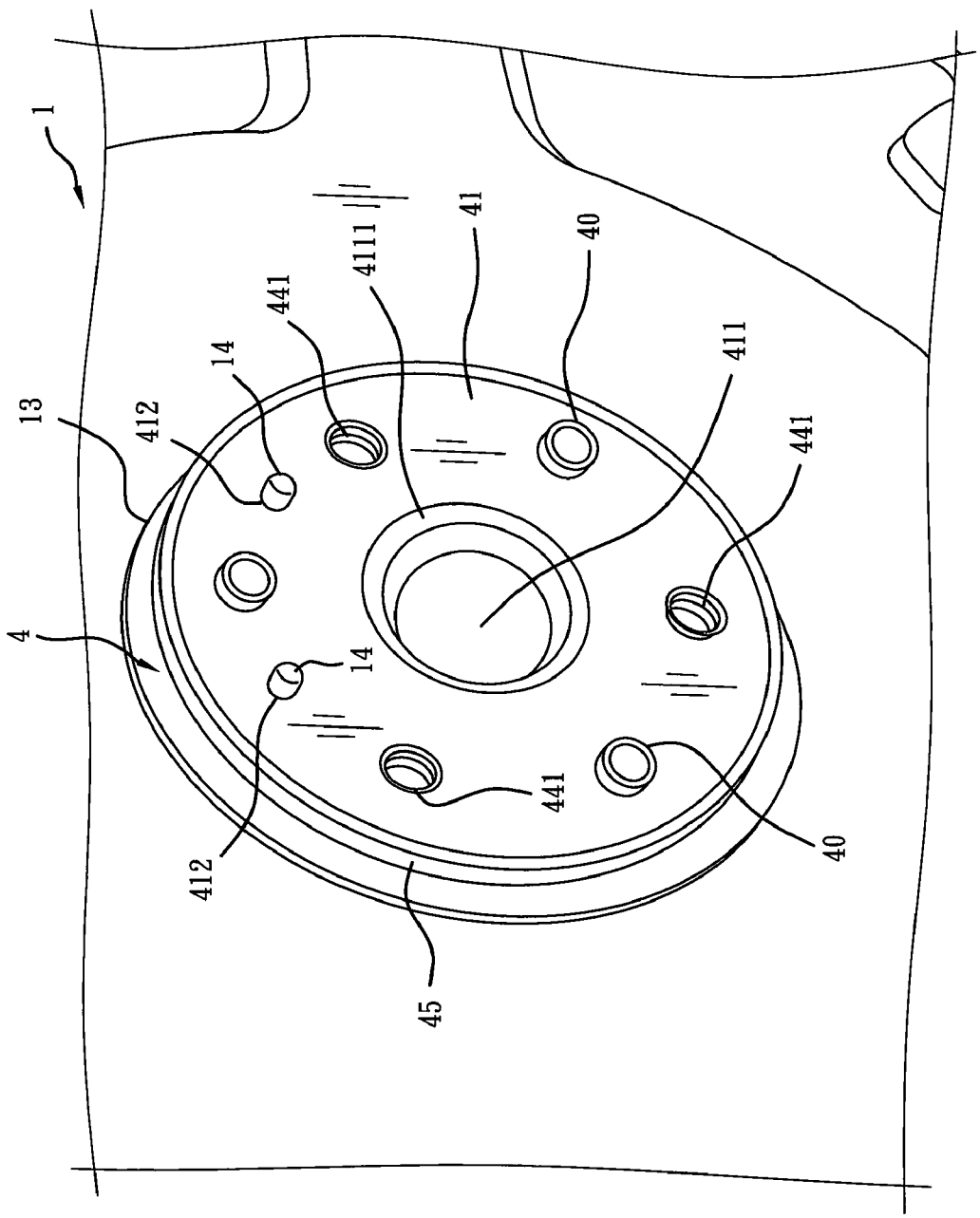
FIG. 7 is an enlarged view of a part of the present invention, showing the back board and the ball socket fastened together.

The mounting frame 6 comprises a mounting base 60, a supporting bar 61, and an extension bar 66. The mounting base 60 comprises a plurality of mounting holes 601 adapted for fastening to a ceiling or wall of a supermarket, shop, etc., a coupling hole (not shown), and an annular sliding way 603 surrounding the coupling hole. The supporting bar 61 has a plurality of first mounting holes 613 longitudinally arranged at one end and selectively fastened to the coupling hole of the mounting base 60 by a screw 62 and a nut, and a plurality of second mounting holes 613 longitudinally arranged at an opposite end. The extension bar 66 has a plurality of longitudinally spaced mounting holes 661 respectively fastened to the second mounting holes 613 of the supporting bar 61 by screws 67 and nuts 65 and a mounting hole 662 fastened to the screw rod 321 of the ball head connecting rod 3 by a washer 34 and a nut 33 (see FIG. 7). Further, the longitudinally spaced mounting holes 661 of the extension bar 66 may be directly fastened with the mounting base 60 to a vertical wall (see FIG. 11).

The main features of the present invention are outlined hereinafter.

Figure 8:
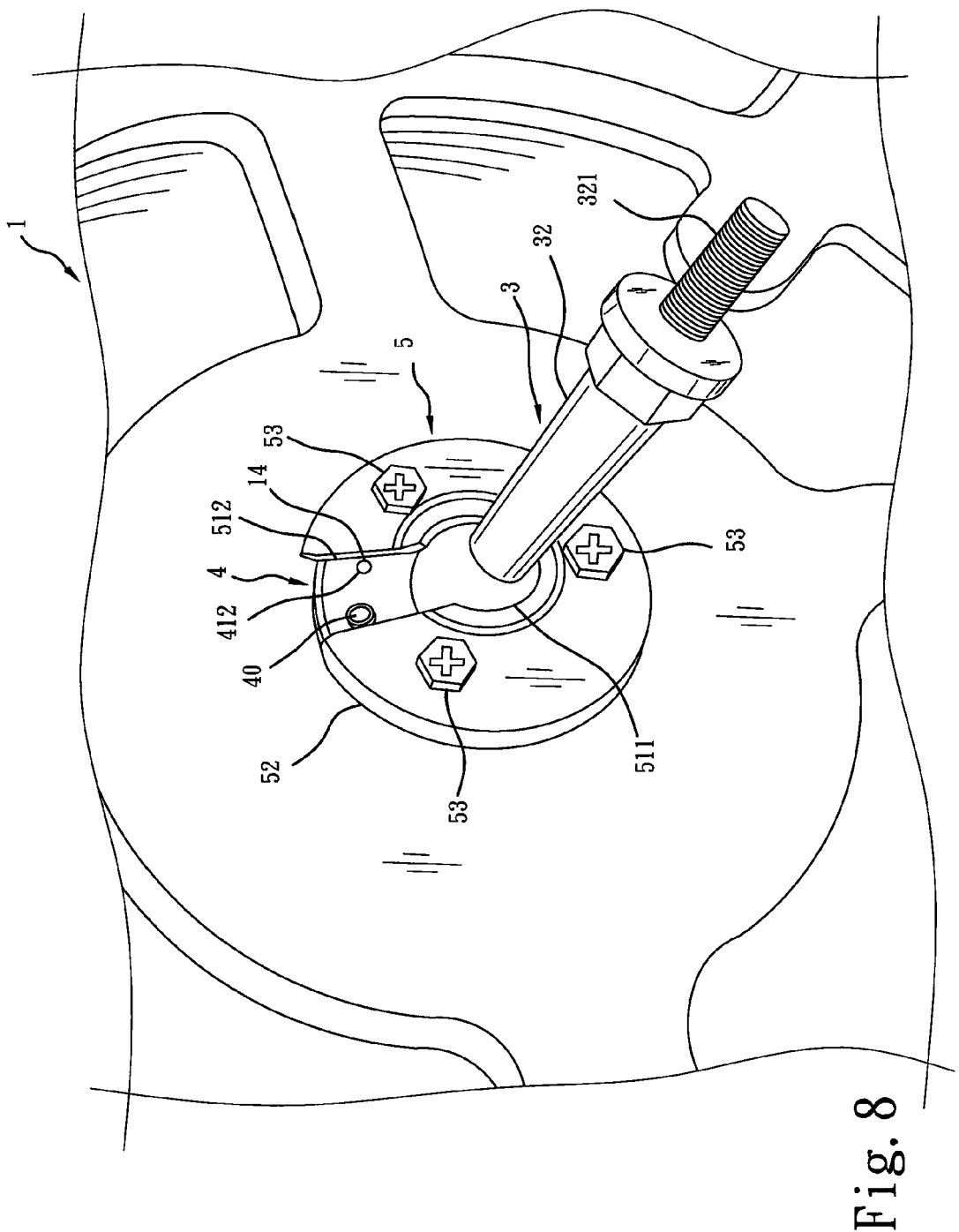
FIG. 8 is a rear elevation of a part of the present invention, showing the back board, the ball socket, the ball head connecting rod and the ball socket cover fastened together.

The back board 1 has an integrated endless rib 13 protruded from the back side thereof at the center, a plurality of circular stub rods 14 protruded from the back side within the area surrounded by the endless rib 13, a plurality of rivet holes 15 cut through the front and back sides within the area surrounded by the endless rib 13, a plurality of retaining holes 16 cut through the front and back sides within the area surrounded by the endless rib 13, a center opening 17 cut through the front and back sides at the center, and a plurality of locating blocks 18 protruded from the front side and equiangularly spaced from one another near the border (see FIG. 8 and FIG. 9). Self-tapping screws 22 are driven through the rim 11 of the back board 1 and the rim 21 of the mirror 2 to affix the back board 1 and the mirror 2 together. The locating blocks 18 are respectively spaced from the rim 11 of the back board 1 at a predetermined distance. Each locating block 18 has an inner wall 182, an outer wall 183 and a slot 181 defined between the inner wall 182 and the outer wall 183 (see FIG. 9). When driving the self-tapping screws 22 through the rim 11 of the back board 1 and the rim 21 of the mirror 2 to affix the back board 1 and the mirror 2 together, the ends of the self-tapping screws 22 are respectively driven through the inner wall 182 and the outer wall 183 of each of the locating blocks 18, enhancing the connection stability and avoiding loosening or deformation of the mirror 2 due to excessive high fastening pressure. Further, mounting through holes 112 and 211 are respectively made on the rim 11 of the back board 1 and the rim 21 of the mirror 2 for the passing of the self-tapping screws 22 for enabling the self-tapping screws 22 to be driven into the locating blocks 18 to affix thee back board 1 and the mirror 2 together conveniently without producing a compression force to deform the mirror 2.

The ball socket 4 is made of a galvanized steel plate or stainless steel plate by stamping. The ball socket 4 further has a center through hole 411 cut through the center of the rounded recess 4111, a plurality of circular locating holes 412 for receiving the stub rods 14 of the back board 1, a plurality of rivet holes 413 respectively fastened to the rivet holes 15 of the back board 1 with rivets 40 (see FIG. 7), and a plurality of hollow cylindrical posts 44 integrally formed of a part of the flat circular base 41, and a rim 45 extending around the border. The aforesaid screw holes 441 are respectively defined hollow cylindrical posts 44.

The socket cover 5 is integrally made of a stainless steel plate by stamping.

During the assembly process of the convex mirror, the rim 45 of the ball socket 4 is fitted into the endless rib 13 of the back board 1 to force the locating holes 412 and hollow cylindrical posts 44 of the ball socket 4 into engagement with the stub rods 14 and retaining holes 16 of the back board 1 respectively, and then the rivet holes 413 of the ball socket 4 are respectively fastened to the rivet holes 15 of the back board 1 with rivets 40 (see FIG. 7), and then the ball head 31 of the ball head connecting rod 3 is inserted into the rounded recess 4111 of the ball socket 4, and then the socket cover 5 is capped on the ball socket 4 by one single hand, and then screws 53 are respectively inserted through the mounting through holes 513 of the socket cover 5 and threaded into the respective screw holes 441 in the hollow cylindrical posts 44 of the ball socket 4 to affix the socket cover 5 to the ball socket 4, and then the rim 21 is inserted in between the rim 11 of the back board 1 and the locating blocks 18 (see FIG. 9), and then self-tapping screws 22 are respectively inserted through the mounting through holes 112 on the rim 11 of the back board 1 and the mounting through holes 221 on the rim 21 of the mirror 2 and driven into the locating blocks 18 to affix thee back board 1 and the mirror 2 together, and then the screw rod 321 of the ball head connecting rod 3 is fastened to the mounting hole 662 of the extension bar 66, and thus the convex mirror is assembled.

Further, the rim 11 of the back board 1 has equiangularly spaced recessed portions 111 to facilitate installation of the self-tapping screws 22 in affixing the rim 21 of the mirror 2 to the locating blocks 18 mounting through holes 112.

In conclusion, the invention provides a convex mirror, which has the following advantages and features:

1. By means of forcing the locating holes 412 and hollow cylindrical posts 44 of the ball socket 4 into engagement with the stub rods 14 and retaining holes 16 of the back board 1 respectively, and then the rivet holes 413 of the ball socket 4 are respectively fastened to the rivet holes 15 of the back board 1 with rivets 40 to affix the ball socket 4 to the back board 1 together (see FIG. 7). Thereafter, the operator can use one single hand to install screws 53 in affixing the socket cover 5 to the ball socket 4 (see FIG. 9), and then the operator can insert the rim 21 of the mirror 2 in between the rim 11 of the back board 1 and the locating blocks 18 and then install the self-tapping screws 22 to affix thee back board 1 and the mirror 2 together. Thus, the assembly process of the convex mirror is quite simple and easy, saving much labor and time.

2. The ball head 31 of the ball head connecting rod 3 is held between the ball socket 4 and the socket cover 5, however the screws 53 are fastened tight to affix the socket cover 5 to the ball socket 4, the pressure from the screws 53 is distributed through the rim 45, avoiding deformation of the ball socket 4, assuring connection reliability of the ball head connecting rod 3 and maintaining product quality.

3. During the assembly process of the present invention, the rim 21 of the mirror 2 is inserted in between the rim 11 of the back board 1 and the locating blocks 18 and then the self-tapping screws 22 are driven into the locating blocks to affix the back board 1 and the mirror 2 together. When driving the self-tapping screws 22 through the rim 11 of the back board 1 and the rim 21 of the mirror 2 to affix the back board 1 and the mirror 2 together, the ends of the self-tapping screws 22 are respectively driven through the inner wall 182 and the outer wall 183 of each of the locating blocks 18, enhancing the connection stability and avoiding loosening or deformation of the mirror 2 due to excessive high fastening pressure.

4. The nuts 63 and 65 are threading onto the screws 62 and 67 are flange nuts, assuring fastening tightness without any washers.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A convex mirror comprising:
   a back board injection-molded from high-impact plastics, said back board having a rim forwardly extended from a front side around the border thereof and an air vent cut through the front and rear sides near a bottom side thereof;
   a mirror being a convex lens molded from polycarbonate, said mirror having a rim extending around the border thereof and attached to an inner side of the rim of said back board and affixed thereto;
   a plurality of self-tapping screws driven through the rim of said back board and the rim of said mirror to affix said mirror and said back board together;
   a ball head connecting rod, said ball head connecting rod having a rod body, a ball head at one end of said rod body and a screw rod at an opposite end of said rod body for fastening to a mounting frame with a nut and a washer;
   a ball socket, said ball socket having a flat circular base, a rounded recess at the center of the flat circular base of said ball socket for receiving the ball head of said ball head connecting rod, and a plurality of screw holes cut through the flat circular base of said ball socket and equiangularly spaced around said rounded recess;
   a socket cover covered on said ball socket to hold the ball head of said ball head connecting rod in the rounded recess of said ball socket, said socket cover comprising a circular cover base, a rim perpendicularly expending around the border of said circular cover base, a plurality of mounting through holes respectively fastened to the screw holes of said ball socket by screws, a center through hole cut through the center of said circular cover base for the passing of said ball head connecting rod, and an opening radially extended from the center through hole of said socket cover to the border of said socket cover to provide a space within which said ball head connecting rod is movable to adjust an angular position of said ball head connecting rod relative to said ball socket;
   said mounting frame comprising a mounting base, a supporting bar and a extension bar, said mounting base having a plurality of mounting holes adapted for fastening to a support in a building, a coupling hole and an annular sliding way surrounding said coupling hole, said supporting bar having a plurality of first mounting holes longitudinally arranged at one end thereof and selectively fastened to the coupling hole of said mounting base by a screw and a nut and a plurality of second mounting holes longitudinally arranged at an opposite end thereof, said extension bar having a plurality of longitudinally spaced mounting holes respectively fastened to the second mounting holes of said supporting bar by screws and nuts and a mounting hole fastened to the screw rod of said ball head connecting rod by a washer and a lock nut;
   wherein:
   said back board has an integrated endless rib protruded from a back side thereof at the center, a plurality of stub rods protruded from the back side thereof within the area surrounded by said endless rib, a plurality of rivet holes cut through the front and back sides thereof within the area surrounded by said endless rib, a plurality of retaining holes cut through the front and back sides thereof within the area surrounded by said endless rib, a center opening cut through the front and back sides thereof at the center, and a plurality of locating blocks protruded from the front side thereof and equiangularly spaced from one another near the border thereof, said locating blocks being respectively spaced from the rim of said back board at a predetermined distance, each said locating block having an inner wall, an outer wall and a slot defined between said inner wall and said outer wall, said self-tapping screws being respectively inserted through the rim of said back board and the rim of said mirror and respectively driven through the inner wall and outer wall of each of said locating blocks to affix said mirror and said back board together and to avoid deformation of said mirror;

said ball socket is made of a steel plate member by stamping, said ball socket having a center through hole cut through the center of said rounded recess, a plurality of locating holes respectively coupled to the stub rods of said back board, a plurality of rivet holes respectively fastened to the rivet holes of said back board with rivets, and a plurality of hollow cylindrical posts integrally formed of a part of the flat circular base of said ball socket, and a rim extending around the border of thereof, said hollow cylindrical posts having the screw holes of said ball socket respectively defined therein;

said socket cover is integrally made of a stainless steel plate by stamping.

2. The convex mirror of claim 1, wherein the rim of said back board has a plurality of equiangularly spaced recessed portions to facilitate installation of said self-tapping screws.

3. The convex mirror of claim 1, wherein the stub rods of said back board are circular stub rods.

4. The convex mirror of claim 1, wherein the locating holes of said ball socket are circular locating holes.

5. The convex mirror of claim 1, wherein said back board has a plurality of mounting through holes cut through the rim thereof corresponding to said locating blocks for the mounting of said self-tapping screws; said mirror has a plurality of mounting through holes cut through the rim thereof corresponding to the mounting through holes of said back board for the mounting of said self-tapping screws.

* * * * *